United States Patent [19]

Giel

[11] 4,271,202
[45] Jun. 2, 1981

[54] PARTICULATE LACTOSE-STARCH HYDROLYSATE BASED FLAVORING MATERIALS AND METHOD OF PRODUCING SAME

[75] Inventor: Thomas H. Giel, Cincinnati, Ohio

[73] Assignee: Mallinckrodt, Inc., St. Louis, Mo.

[21] Appl. No.: 64,053

[22] Filed: Aug. 6, 1979

Related U.S. Application Data

[63] Continuation-in-part of Ser. No. 853,526, Nov. 21, 1977, abandoned, which is a continuation-in-part of Ser. No. 640,189, Dec. 12, 1975, abandoned.

[51] Int. Cl.³ .............................................. A23L 1/221
[52] U.S. Cl. ..................................... 426/96; 426/650; 426/651
[58] Field of Search .......................... 426/96, 650, 651

[56] References Cited

U.S. PATENT DOCUMENTS

| | | | |
|---|---|---|---|
| 2,088,622 | 8/1937 | Stokes et al. ........................ | 426/538 |
| 2,857,281 | 10/1958 | Schultz et al. ..................... | 426/650 X |
| 3,264,114 | 8/1966 | Glicksman et al. .............. | 426/576 X |
| 3,554,768 | 1/1971 | Feldman .......................... | 426/650 X |
| 3,644,127 | 2/1972 | Morris et al. .................... | 426/650 X |
| 3,660,115 | 5/1972 | Revie ............................... | 426/651 X |
| 3,736,149 | 5/1973 | Knatt .................................... | 426/96 |

*Primary Examiner*—Joseph M. Golian
*Attorney, Agent, or Firm*—Wood, Herron & Evans

[57] ABSTRACT

Particulate flavoring materials are provided having a flavoring oil fixed in a particulate matrix containing lactose and a starch hydrolysate. The ratio of lactose to the starch hydrolysate in the particulate matrix is such that at least about 30% flavoring oil per total particulate matrix is entrapped in the matrix and less than about 4% flavoring oil per total matrix is unentrapped on the surface of the particles. The particulate flavoring materials herein provided thus effectively fix flavoring volatiles for storage without vaporization and/or chemical alteration of the flavoring power. The high quantity of flavoring oil contained per unit weight of matrix material in the flavoring particles provides significant economies with regard to storage, transportation, and manufacturing costs.

12 Claims, 1 Drawing Figure

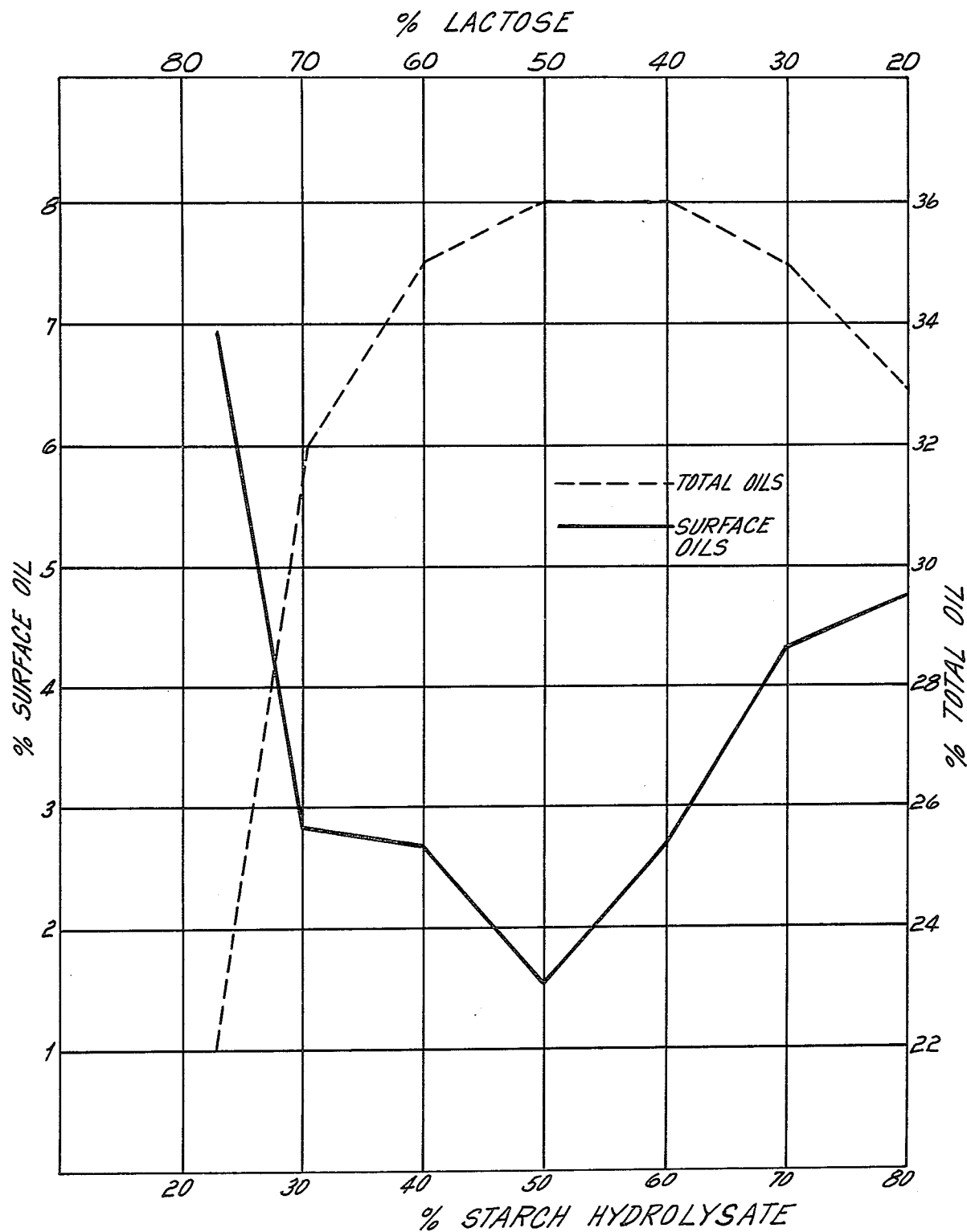

PARTICULATE LACTOSE-STARCH HYDROLYSATE BASED FLAVORING MATERIALS AND METHOD OF PRODUCING SAME

RELATED APPLICATIONS

This application is a continuation-in-part of application Ser. No. 853,526, filed Nov. 21, 1977, now abandoned, which in turn is a continuation-in-part of application Ser. No. 640,189, filed Dec. 12, 1975, now abandoned.

BACKGROUND OF THE INVENTION

A considerable amount of effort has been devoted for many years to provide solid particulate flavoring materials in which a flavoring oil is contained in the particulate matrix. Various attempts have been made to fix essential flavoring oils in many different types of organic matrices to provide stable free flowing powders which contain the flavoring oils for flavor release when incorporated into many types of foods. Typical examples of flavor fixation are illustrated in rather recent patents, namely, U.S. Pat. Nos. 3,314,803; 3,554,768 and 3,736,149. These patents illustrate attempts to incorporate a flavoring oil or volatile ingredient into a carbohydrate matrix, particularly volatile acetaldehyde. With respect to U.S. Pat. No. 3,314,803, the fixation of acetaldehyde in mannitol is disclosed wherein relatively low amounts of acetaldehyde on the order of about 10% or less are initially fixed in a matrix with deterioration or loss of the fixed acetaldehyde over a period of time. In connection with U.S. Pat. No. 3,554,768, a composition is disclosed which contains acetaldehyde fixed in a carbohydrate such as either a hydrophilic colloid, partially hydrolyzed starch or sugar, and mixtures of such carbohydrates are suggested. More particularly, U.S. Pat. No. 3,554,768 in its operating examples suggests that either lactose, lactose-maltose, larch gum, tapioca dextrin and gum arabic may be employed as matrices for a method of spray-drying aqueous acetaldehyde compositions to provide spray-dried products, but only low levels of acetaldehyde fixation are achieved and such levels are reduced upon storage. In connection with U.S. Pat. No. 3,736,149, flavoring compositions are disclosed which comprise a flavoring agent including acetaldehyde fixed in a matrix material containing lactose, a hydrocolloid gum and a starch hydrolysate, wherein the patent suggests that preferably about 5 to 50% of lactose is present in the stabilized acetaldehyde compositions. Furthermore, in U.S. Pat. No. 3,736,149 the operating examples disclose that the lactose is present in an amount of about 15–20% by weight with the balance being a mixture of starch hydrolysate and hydrocolloid gum of about 80–85% by weight based upon the three components. In both U.S. Pat. Nos. 3,554,768 and 3,736,149, initial flavor fixation levels of about 10% or less are obtained with a reduction in the flavor level with the passage of storage time. The above mentioned patents are merely illustrative of the considerable volume of patent literature related to the fixation of flavoring agents in various matrices and it is not the purpose in this rather brief background of the invention to fully detail all of the prior art in this area. Other patents included in such patent literature are U.S. Pat. Nos. 2,088,622; 2,258,567; 2,369,847; 2,555,465; 2,673,157; 2,702,262; 2,809,895; 2,824,807; 2,856,291; 2,857,281; 2,929,723; 2,935,409; 3,041,180; 3,264,114; 3,336,139; 3,764,346 and 3,787,592.

In view of the vast body of art in the area of fixed flavor compositions, to applicant's knowledge, it has not before this invention been previously reported that volatile flavoring agents could be fixed in certain carbohydrate matrices in significantly large amounts without detrimental amounts of flavoring agents on the particle surfaces, and it has not heretofore been known to provide a method for producing such particulate flavor compositions in an effective manner without loss of flavoring components.

SUMMARY OF THE INVENTION

This invention is directed to novel particulate flavoring materials and methods of producing same. The particulate flavoring materials, according to the principles of this invention, comprise a flavoring oil fixed in a particulate matrix of lactose and a starch hydrolysate. It has been found that particulate flavoring materials can be produced which contain substantial amounts of flavoring oil entrapped in the particle matrix on the order of at least about 30% to about 60% or more of the flavoring oil per total particle weight and wherein less than about 4% of flavoring oil is unentrapped on the surface of the particles.

Furthermore, it has been found that a particulate flavoring composition can be prepared by forming an aqueous mixture of the flavoring oil, lactose and a starch hydrolysate and spray-drying the aqueous mixture under the influence of heat to form a particulate flavoring composition having substantial amounts of fixed flavoring oil in the matrix with only an insignificant amount of unentrapped agent on the surface of the particles. Another advantage of the method is that all or nearly all of the flavoring oil starting material can be fixed in the particulate matrix.

This invention is predicated in part upon the discovery that certain combinations of lactose and starch hydrolysate can be employed in aqueous admixture with a flavoring oil and, where the ratio of the lactose to the starch hydrolysate in the aqueous admixture is controlled, the aqueous mixtures may be spray-dried and at least 30% flavoring oil is fixed per total particle weight with less than about 4% of the flavoring oil unentrapped on the surface of the particles. The ratio of ingredients in the matrix is important, but nevertheless within the scope of this invention it will be appreciated that there may be variances to achieve the substantial entrapment of the flavoring oil in the matrix with minimal residual agent on the particle surface.

More particularly, in the preferred embodiment, lactose within the range of about 40 to about 70% by weight and a starch hydrolysate within the range of about 60 to about 30% by weight, based upon the total weight of these ingredients may be dispersed in aqueous admixture with an amount of flavoring oil. The flavoring oils are contained in amounts at least about 30 to about 60% by volume based on the total matrix and oil ingredients. This aqueous admixture may be spray-dried under the influence of heat, e.g., warm air, using typical nozzle spray-drying apparatus where the drying temperatures are generally of about 180° F. to about 450° F. For example, flavoring oil fixation in lactose-hydrolyzed starch of at least about 30% to about 60% by volume/weight has been achieved. Furthermore, even with such significant amounts of flavoring oil fixation, surface oil on the spray-dried particles in less than about 4%. Also, unexpectedly, where about 50% by weight of lactose is combined with about 50% by weight hydrolyzed starch, at least 30% by volume flavoring oil fixation with less than about 2% particle surface oil is achieved. The exact mechanism for such superior entrapment with lack of residual surface oil is not known but empirical results have been obtained. As mentioned above, it has been found essential that the ratio of the lactose to the hydrolyzed starch be maintained within a range to achieve the advantageous results. For example, where lactose is employed with a starch hydrolysate, as the amount of hydrolyzed starch increases above 60%, the initial amount of total oil in the particles may be greater than 30%, however, the surface oil increases above 4% and this is found to be unsatisfactory. When the amount of surface oil increases above about 4%, the flavoring composition becomes susceptible to alteration by chemical change thereby deviating from the taste sought in the flavoring composition and in the food preparations containing same. Such alteration affects the entire flavoring composition. Oftentimes, compositions become rancid and must be discarded; and considerable economic loss may be incurred depending upon the volume of spoilage. On the other hand, with the compositions of this invention substantial amounts of flavoring agents may be entrapped, and stored for significant periods of time without loss or deterioration of essential flavoring components. Also, by reason of the substantial amount of flavoring agent fixation in a particulate matrix, substantial savings in the manufacture, storage and shipment of such flavoring materials are achieved. Similarly, as the amount of lactose increases above about 70%, oil content drops off significantly to below 30% and surface oil increases to nearly 7%. As the amount of lactose decreases below about 40%, the surface oils increase above 4%. Therefore, it has been found that the ratios of ingredients above mentioned are critical to achieve the results.

The advantages and objectives of this invention can be achieved with a number of flavoring oils. Accordingly, the term "flavoring oil", as used herein, encompasses any one of a number of natural essential oils or such oils mixed with synthetic chemical flavorants or flavor enhancers. Exemplary are grape, orange, cranberry, lemon and lime oils or extracts; flavoring oils including imitation strawberry, imitation raspberry, imitation cherry, imitation peach, etc. Accordingly, it is to be understood that these mentioned flavoring oils are exemplary of the type which may be used and are not limitations on the scope of this invention. The percentages of entrapment or surface residue of the flavor oil are expressed as % volume per total particle weight.

Thus, lactose and hydrolyzed starch in certain ratios provide the advantageous results and objectives of this invention. Of the hydrolyzed starches or the starch hydrolysates useful in accordance with this invention are those of the type mentioned in the foregoing patents, namely, U.S. Pat. Nos. 3,554,768 and 3,736,149. As described in these patents, these starches are obtained by partially hydrolyzing starch usually to from about 1 to about 20 Dextrose Equivalent (DE). Partially hydrolyzed starches commercially available are usually within this range DE and are suitable for use. However, it is not intended to limit this invention to the precise degree of hydrolysis in its broadest aspects because it is not currently known that such a degree is critical. However, in contrast, the disclosures of these and other patents would suggest that lactose is an inferior flavor base or, in any event, should be used in low amounts in combination with other bases. Applicant has herewith proven otherwise at certain ratios. When other ratios are employed, either the aqueous mixture may not be particulated such as by spray-drying, or substantial fixation of at least about 30% flavoring oil with less than about 4% surface residue cannot be achieved, or more than 25% of the oil is lost in processing. For instance, when lactose is employed in mixture with hydrocolloid gum arabic at the ratios of 60% to 40% gum, the flavor fixation drops drastically to below 20% and surface residue increases, or flavor volatiles are lost. It has also been established that lactose alone, or hydrolyzed starch alone, as the matrix material with either not permit aqueous mixtures with flavoring oils to be spray-dried under normal conditions, or if they are spray-dryable, the products will not fix significant amounts of oil at levels achieved by this invention without significant surface oil levels, and even flavor oils will be lost in processing. Even further, monosaccharides have not been found suitable to achieve the advantages and objectives of this invention when attempts are made to use these compounds alone or in combination with other carbohydrates at levels similar to those used with the disaccharide of this invention.

Accordingly, in this invention, the combination and ratio of lactose to the hydrolyzed starch is essential to achieve the substantial flavor entrapment with lack of residual surface flavor oil in the particulate flavoring composition. These particulate compositions and methods of this invention will be further understood, and the advantages and objectives obtained, in accordance with the following examples.

EXAMPLE 1

An aqueous mixture of lactose was prepared by mixing 3.9 lbs. of lactose in 2 gallons of water. To this mixture was added 2.6 lbs. of Kadex 123–100, a starch hydrolysate prepared from tapioca starch by oxidation with hydrolyzation and having a Dextrose Equivalent (DE) of about 1–2, (a product of Stein Hall Company) and mixed well. A 25% by weight sodium benzoate solution in an amount of 1 fluid ounce was added to the lactose-modified starch solution. The sodium benzoate was added merely as a preservative. An orange oil in an amount of 64 fluid ounces (density about 0.85 g/cc) was added to the resultant mixture to provide a 40% by volume per weight of ingredients and the entire mass was mixed well to form an emulsion. The emulsion was then fed into a nozzle type spray dryer at 2500 psi. The sprayed particles were introduced into a vertical drying chamber fed with heated air whose inlet temperature was about 300° F. and the outlet temperature was about 180° F. Particles were collected at the bottom of the drying chamber. A particulate flavoring composition was prepared upon spray-drying which was analyzed to contain about 34% by volume orange oil flavor/weight basis (cc per 100 grams of particulate composition). This determination may be made in the case of orange oil by distillation of the oil from the resultant particles. In addition, a surface oil analysis was run by the addition of an amount of the spray-dried particles to a perchloroethylene solvent and, after shaking of the particles for about ½ to 1 minute, then separating the solvent from the extracted surface oil, it was determined that the surface oil was about 3.2% volume/weight.

EXAMPLES 2-5

A series of examples were performed varying the ratio of the lactose to the hydrolyzed starch component, employing the same procedures as in Example 1. However, in this series the starch hydrolysate employed was National 46, a modified food starch derived from a corn having a DE of about 1-5 (National Starch Company). In this series of examples, only the amounts of starch hydrolysate and lactose were varied, respectively, from about 60%-30% by weight of starch hydrolysate to 40%-70% weight of lactose on a total parts by weight basis for the two matrix components. In each example the amount of orange oil remained the same and was about 40% by volume/weight as above for addition to the aqueous admixture prior to spray-drying. Following the same spray-drying procedures, particulate flavoring compositions were obtained in the manner according to Example 1 and the results are reported in the following Table 1. These results are also diagrammatically illustrated in the drawing. The drawing and the Table 1 highlight the unexpected results of this invention. The drawing is a graphical representation of Examples 2-8. It illustrates the 30-60% starch hydrolysate range in combination with 40-70% lactose by weight as a particulate flavor matrix with at least 30% flavoring oil entrapped and less than 4% unentrapped on the surface.

TABLE 1

| | EXAMPLES | | | | | | |
|---|---|---|---|---|---|---|---|
| | 2 | 3 | 4 | 5 | 6 | 7 | 8 |
| % Starch Hydrolysate | 80 | 70 | 60 | 50 | 40 | 30.7 | 23 |
| % Lactose | 20 | 30 | 40 | 50 | 60 | 69.3 | 77 |
| TOTAL OIL | 33 | 35 | 36 | 36 | 35 | 32 | 22 |
| SURFACE OIL | 4.75 | 4.3 | 2.7 | 1.55 | 2.7 | 2.85 | 6.95 |

As demonstrated by Examples 2-8, where the amount of lactose was present in the aqueous admixture within the range of about 40 to about 70% by weight and the amount of hydrolyzed starch was present from about 60 to about 30% by weight, the total volatile flavoring oil content of the particulate composition was in excess of 30%, namely, 32-38% volume/total particle weight; and the entrapped oil was about 30% volume/weight or more. The surface oil content of the particulate flavoring composition was less than 3% by volume, namely, 1.3-2.85% volume/weight. Remarkably, therefore, within the range of lactose from about 40-70% to hydrolyzed starch of about 60-30% by weight, the unentrapped surface oil in the particulate composition was less than about 3% by volume/weight. Accordingly, in the most preferred practice of the invention where a significantly high percent of flavor oil entrapment is desired, i.e., within the range of 30-60%, the ratio of lactose-hydrolyzed starch is on the order of about 40-70% and 60-30%, respectively. On the other hand, when a 23/77 ratio of hydrolyzed starch to lactose is spray-dried, higher surface oil content (6.95%) and less entrapped oils (22%) are obtained. On the opposite end, at a ratio of 70-80 starch to 20-30 lactose while higher total oils were obtained, high surface oils above 4% were also obtained.

These examples also demonstrate that nearly all of the flavoring oil of the aqueous mixtures was fixed according to the invention in the particulate matrix, e.g., about 35% of the 40% charged, or in excess of about 80% by volume.

When flavoring oil and particulate compositions were prepared in accordance with the above examples to obtain an entrapped oil content of about 35% with a surface oil of about 3% or less, storage of the product at 113° F. for 16 weeks exhibited organoleptic stability.

In comparison to the results obtained according to the above examples, attempts were made to employ monosaccharides such as fructose or dextrose with Kadex 123-100 under similar spray-drying conditions, but aqueous mixtures of such monosaccharides at a similar ration with the hydrolyzed starch (i.e., 60%/40%) were not capable of being spray-dried as in Example 1. When percentages of the monosaccharides to the hydrolyzed starch were decreased to 30%/70% to enable spray-drying, initial fixed oil content dropped below 30% by volume/weight and the residual or surface oil was higher than 4% by volume, e.g., 5-6% by volume. When lactose was employed with gum arabic in a ratio of 60%/40%, respectively, the surface oil of the particulate composition was about 5% and the initial fixed oil was about 24% by volume/weight, also indicating a loss of about 40% flavoring oil during spray-drying. Similar results were obtained when lactose was employed with a combination of 20% Kadex 123-100, 20% gum arabic and 60% lactose. Furthermore, when hydrolyzed starch (Morrex 1918 or Kadex 123-100) is employed alone as a matrix material, flavoring oil loss or high surface oil has been observed in processing.

It will be appreciated that the temperatures and conditions used in spray-drying are related to the type of drier and atomizer available, particle size desired and the like. Typically, the inlet temperature of the drier may be about 250°-450° F. and the outlet temperature about 180°-300° F. While the atomizer as described above was a single fluid high pressure nozzle, it may be a centrifugal dish or a two-fluid nozzle using air, steam, or inert gas at the atomizing agent. Driers themselves may be vertical or horizontal.

In view of the above detailed description and operating examples, other modifications and embodiments will become apparent to a person of ordinary skill in the art and such are within the scope of this invention.

What is claimed is:

1. A particulate flavoring material comprising a flavoring oil fixed in a particulate matrix, said particulate matrix consisting essentially of lactose and a partially hydrolyzed starch having a Dextrose Equivalent from about 1 to about 20 wherein the ratio of lactose to starch hydrolysate is on the order of about 40-70% by weight lactose to about 60-30% by weight starch hydrolysate and at least about 30% flavoring oil per total particulate material is entrapped in the matrix with less than about 4% by volume flavoring oil per total particulate material unentrapped on the surface of said particulate matrix.

2. The particulate flavoring material of claim 1 wherein the unentrapped surface oil is less than about 3% by volume flavoring oil per total particulate material weight.

3. The particulate flavoring material of claim 1 wherein the amount of flavoring oil entrapped is up to about 60% per total particulate flavoring material.

4. The particulate flavoring material of claim 2 wherein the amount of flavoring oil entrapped is up to about 60% by volume of flavoring oil per total particulate flavoring material weight.

5. The particulate flavoring material of claim 1 wherein the ratio of the lactose to the starch hydrolysate is about 50-50 with less than about 2% surface oil.

6. A method for preparing a particulate flavoring material comprising forming an aqueous mixture consisting essentially of a flavoring oil, lactose and a partially hydrolyzed starch having a Dextrose Equivalent from about 1 to about 20, and spray-drying the aqueous mixture under the influence of heat to form the particulate flavoring composition wherein the ratio of the lactose to the starch hydrolysate in said aqueous mixture is on the order of about 40–70% by weight to about 60–30% by weight and the mixture is capable of being spray-dried with at least 30% flavoring oil per total particulate material entrapped in the matrix and less than about 4% flavoring oil per total particulate material is unentrapped on the surface of said particulate matrix.

7. The method of claim 6 wherein the unentrapped surface oil is less than about 3% by volume flavoring oil per total particulate material weight.

8. The method of claim 7 wherein the amount of flavoring oil in said aqueous mixture is up to about 60% of the flavoring oil per total lactose, starch hydrolysate and flavoring oil weight.

9. The method of claim 6 wherein the spray-drying is conducted under the influence of heat at temperatures on the order of about 180° to about 450° F.

10. The method of claim 6 wherein at least about 80% of said flavoring oil in said aqueous mixture is entrapped in said particulate matrix.

11. A method for preparing a particulate flavoring material comprising forming an aqueous mixture of a flavoring oil in an amount of about 30 to about 60% by volume, lactose and a partially hydrolyzed starch having a Dextrose Equivalent of about 1 to about 20, wherein the ratio of the lactose to the starch hydrolysate in said aqueous mixture is on the order of about 40–70% by weight to about 60–30% by weight, respectively, and spraying-drying the aqueous mixture under the influence of heat to form the particulate flavoring composition wherein at least 30% by volume flavoring oil per total particulate material weight is entrapped in the matrix and less than about 3% flavoring oil per total particulate material weight is unentrapped on the surface of said particulate matrix and at least about 80% of said flavoring oil of said aqueous mixture is entrapped in said particulate matrix.

12. The method of claim 11 wherein said ratio is about 50–50 with less than about 2% surface oil.

* * * * *